United States Patent Office 2,886,480
Patented May 12, 1959

2,886,480

PROCESSES FOR BONDING POLYMERISABLE SUBSTANCES

Stanley Thomas Deakin, Ewell West, England, assignor, by mesne assignments, to Siemens Edison Swan Limited, Westminster, London, England, a British company No Drawing. Application November 23, 1954
Serial No. 470,795

Claims priority, application Great Britain
December 17, 1953

3 Claims. (Cl. 154—100)

This invention relates to processes for bonding polymerisable substances of the kind known as plastics, with substances which may have a lower melting point temperature than the moulding temperature of the plastic.

The invention has an important application in processes for bonding polytetrafluoroethylene with rubber.

As is well known moulding of thermo-setting plastics involves heating to a fairly definite curing temperature depending on the nature of the plastic, whilst moulding of thermo-plastic plastics involves heating until the plastic becomes sufficiently plastic mechanically. Moulding of polytetrafluoroethylene, hereinafter referred to as P.T.F.E. involves compacting loose particles of the material, e.g. granules or flakes, and heating the compacted material until it forms a kind of plastic gel of a fairly high temperature, i.e. of the order of 350° C. at which temperature the particles will coalesce into a single mass.

It follows, therefore, that in cases where it is desired to bond the plastic with a material whose melting point is lower than the moulding temperature of the plastic, such bonding cannot be carried out until after the moulding of the plastic has been completed.

However, in many cases the surface of the plastic material, after heating, will be very smooth and this will render subsequent bonding very difficult.

The present invention comprises a process of bonding a polymerisable plastic material with a substance incapable of withstanding the moulding temperature of the plastic including the steps of pre-forming the plastic by compressing loose particles, applying to the surfaces of the pre-formed shape particles of a material having a higher melting point than the moulding temperature of the plastic, applying a moulding temperature to the plastic, and finally applying the bonding material to the surface.

The bonding material may be applied to the surface under pressure.

The high melting point particles may be dissolved out by a solvent which does not affect the plastic. This step would be carried out after moulding and before applying the bonding material so as to leave a pitted surface to which the bonding material keys.

Alternatively, the high temperature melting point particles may be left embedded in the plastic so as to leave a roughened surface to which the bonding material adheres.

The embedded particles may be conveniently particles of a metal which is soluble in an acid which does not affect the plastic.

Alternatively, other materials may be employed which are easily removable, e.g. nitro cellulose, which would flash off when the material is heated.

As above mentioned the invention is applicable to processes for bonding resilient materials, such as rubber, to P.T.F.E. and such a process may comprise the steps of pre-forming a shape of the P.T.F.E. by compressing loose particles of the material so as to cause the particles to adhere sufficiently to permit of handling. The preformed P.T.F.E. is then sprayed with a suitable metal, such as aluminum and further compacted cold so as to cause the metal to become embedded in the surface of the P.T.F.E. The P.T.F.E. is then heated to cause the particles to coalesce into the required shape with the aluminium embedded in the surface. After this process the P.T.F.E. may be treated, for instance, with hydrochloric acid to dissolve out the embedded aluminium, if so required. This step in the process leaves a pitted or roughened surface to which rubber, or like material, may be caused readily to bond.

Alternatively, of course, the particles may be left embedded in the plastic. In such a case the particles may be metallic or non-metallic, e.g. glass.

In the case of unvulcanised rubber or partially vulcanised rubber, the bonding may be carried out under pressure so as to cause the rubber to key into the indentations in the surface or to metal particles if not removed dependent on the resilience of the materials required. In the case of fully vulcanised rubber a suitable adhesive may be employed, e.g. of the kind known as rubber solution or alternatively a plastic adhesive or vulcanisable rubber.

The invention is applicable to the manufacture of strip material in which a layer of polytetrafluoroethylene or other plastic material is bonded to a layer of a material such as rubber to form a composite strip.

What I claim as new and desire to secure by Letters Patent of the United States is:

1. A process for the bonding of polytetrafluoroethylene plastic material with a second substance incapable of withstanding the moulding temperature of the polytetrafluoroethylene including the steps of pre-forming the polytetrafluoroethylene by compressing loose granules thereof into a semi-compacted block, spraying directly on to the surface of said block solid particles of a material having a higher melting temperature than the moulding temperature of the polytetrafluoroethylene, thereafter further cold compressing the polytetrafluoroethylene granules so that the solid particles are embedded firmly between the granules and project partly from the surface of the block, subsequently applying a moulding temperature to the polytetrafluoroethylene, and finally applying the second substance to the surface of the block from which the particles project so that the second substance adheres to the particles and is thereby bonded to the polytetrafluoroethylene.

2. A process for bonding polytetrafluoroethylene plastic material with rubber including the steps of preforming the polytetrafluoroethylene by compressing loose granules thereof into a semi-compacted block, spraying directly on to the surface of said block solid particles of a material having a higher melting temperature than the moulding temperature of the polytetrafluoroethylene, thereafter further cold compressing the polytetrafluoroethylene granules so that solid particles are embedded firmly between the granules and project partly from the surface of the block, subsequently applying a moulding temperature to the polytetrafluoroethylene, applying unvulcanized rubber containing sulphur directly to the surface of the block from which the particles project, and finally aplying heat to vulcanize the rubber in situ and cause it to adhere to the polytetrafluoroethylene.

3. A process for bonding polytetrafluoroethylene plastic material with rubber including the steps of preforming the polytetrafluoroethylene by compressing loose granules thereof into a semi-compacted block, spraying directly on to the surface of said block solid metallic particles, thereafter further cold compressing the polytetrafluoroethylene granules so that solid particles are embedded firmly between the granules and project partly from the surface of the block, subsequently applying a moulding temperature to the polytetrafluoroethylene, applying unvulcanized rubber containing sulphur directly to the surface of the block from which the particles project, and finally applying heat to vulcanize the rubber in situ and cause it to adhere to the polytetrafluoroethylene.

References Cited in the file of this patent

UNITED STATES PATENTS

| | | | |
|---|---|---|---|
| 1,184,015 | Price | May 23, | 1916 |
| 1,819,147 | Bronson | Aug. 18, | 1931 |
| 2,275,989 | Perry | Mar. 10, | 1942 |
| 2,439,137 | Keller | Apr. 6, | 1948 |
| 2,520,173 | Sanders | Aug. 29, | 1950 |
| 2,573,639 | Coler | Oct. 30, | 1951 |
| 2,638,523 | Rubin | May 12, | 1953 |
| 2,663,663 | Weltman et al. | Dec. 22, | 1953 |
| 2,689,805 | Croze et al. | Sept. 21, | 1954 |
| 2,705,691 | Panagrossi et al. | Apr. 5, | 1955 |
| 2,710,629 | Price | June 14, | 1955 |
| 2,711,985 | Olson | June 28, | 1955 |
| 2,724,177 | Coffman | Nov. 22, | 1955 |
| 2,728,698 | Rudner | Dec. 27, | 1955 |